United States Patent
Okada (10) Patent No.: US 10,464,696 B2
(45) Date of Patent: Nov. 5, 2019

(54) SPACE DEVICE, DEBRIS REMOVAL SYSTEM, AND METHOD FOR REMOVING DEBRIS

(71) Applicant: Astroscale Japan Inc., Tokyo (JP)

(72) Inventor: Mitsunobu Okada, Singapore (SG)

(73) Assignee: ASTROSCALE JAPAN INC., Tokyo (JP)

( * ) Notice: Subject to any disclaimer, the term of this patent is extended or adjusted under 35 U.S.C. 154(b) by 264 days.

(21) Appl. No.: 15/126,274

(22) PCT Filed: Mar. 18, 2015

(86) PCT No.: PCT/JP2015/058048
§ 371 (c)(1),
(2) Date: Sep. 14, 2016

(87) PCT Pub. No.: WO2015/141722
PCT Pub. Date: Sep. 24, 2015

(65) Prior Publication Data
US 2017/0081051 A1    Mar. 23, 2017

(30) Foreign Application Priority Data
Mar. 18, 2014 (JP) ................. 2014-055202

(51) Int. Cl.
*B64G 1/24* (2006.01)
*B64G 1/62* (2006.01)
(Continued)

(52) U.S. Cl.
CPC .......... *B64G 1/646* (2013.01); *B64G 1/1078* (2013.01); *B64G 1/24* (2013.01); *B64G 1/242* (2013.01); *B64G 1/403* (2013.01); *B64G 1/405* (2013.01); *B64G 1/62* (2013.01); *B64G 1/64* (2013.01); *B64G 4/00* (2013.01); *B64G 1/288* (2013.01);
(Continued)

(58) Field of Classification Search
CPC . B64G 1/646; B64G 1/64; B64G 1/62; B64G 1/1078
See application file for complete search history.

(56) References Cited

U.S. PATENT DOCUMENTS

| 5,511,748 A | 4/1996 | Scott |
| 5,806,802 A | 9/1998 | Scott |

(Continued)

FOREIGN PATENT DOCUMENTS

| CA | 2853892 A1 * | 5/2013 | ............ B64G 1/646 |
| CN | 103224037 A | 7/2013 | |

(Continued)

OTHER PUBLICATIONS

DeLuca et al., "Active Removal of Large Massive Objects by Hybrid Propulsion Module", 2013. 5th European Conference for Aeronautics and Space Sciences. (Year: 2013).*

(Continued)

*Primary Examiner* — Richard R. Green (57) ABSTRACT

A space device includes: an adhesion part to adhere to a target existing in the space; and a propulsion part to obtain propulsion power. The space device that adheres to the target at the adhesion part moves together with the target by the propulsion part, thereby conveying the target to a predetermined target position.

18 Claims, 6 Drawing Sheets

(51) Int. Cl.
    *B64G 1/64* (2006.01)
    *B64G 1/36* (2006.01)
    *B64G 1/10* (2006.01)
    *B64G 1/40* (2006.01)
    *B64G 4/00* (2006.01)
    *B64G 1/28* (2006.01)

(52) U.S. Cl.
    CPC ............... *B64G 1/36* (2013.01); *B64G 1/361* (2013.01); *B64G 2004/005* (2013.01)

(56) References Cited

U.S. PATENT DOCUMENTS

| | | | | |
|---|---|---|---|---|
| 6,655,637 | B1* | 12/2003 | Robinson | B64G 1/646 244/172.4 |
| 7,370,834 | B2 | 5/2008 | Scott | |
| 9,434,485 | B1* | 9/2016 | Lehocki | B64G 1/646 |
| 2005/0151022 | A1 | 7/2005 | D'Ausilio et al. | |
| 2007/0125910 | A1 | 6/2007 | Cepollina et al. | |
| 2007/0228220 | A1 | 10/2007 | Behrens et al. | |
| 2011/0198446 | A1 | 8/2011 | Knirsch et al. | |
| 2012/0076629 | A1 | 3/2012 | Goff et al. | |
| 2012/0286100 | A1 | 11/2012 | Knirsch | |
| 2014/0064905 | A1* | 3/2014 | Prahlad | B64G 1/646 414/751.1 |
| 2014/0367523 | A1 | 12/2014 | Kitazawa et al. | |

FOREIGN PATENT DOCUMENTS

| | | |
|---|---|---|
| CN | 103241393 | 8/2013 |
| JP | H08-505828 A | 6/1996 |
| JP | 2004-098959 A | 4/2004 |
| JP | 2010-069973 A | 4/2010 |
| JP | 2011-168270 A | 9/2011 |
| JP | 2012041504 | 3/2012 |
| JP | 2012-236591 A | 12/2012 |
| WO | WO 2005/118394 A1 | 12/2005 |
| WO | 2013011073 A1 | 1/2013 |
| WO | WO 2013/065795 A1 | 5/2013 |

OTHER PUBLICATIONS

International Search Report for International Patent Application No. PCT/JP2015/058048 filed on Mar. 18, 2015.

Extended European Search Report for European Patent Application No. 15765919.4, dated Oct. 18, 2017.

Chief Editor V.P. Glushk, "Ground automated control complex (NAKU)", Astronautics: Encyclopedia.—M. Soviet Encyclopedia, 1985, pp. 260-262.

Office Action from Russian Patent Office for Application No. 2016140860, dated Aug. 7, 2018.

* cited by examiner

SPACE DEVICE, DEBRIS REMOVAL SYSTEM, AND METHOD FOR REMOVING DEBRIS

CROSS-REFERENCE TO RELATED APPLICATIONS

The present specification is a U.S. National Stage of International Patent Application No. PCT/JP2015/058048 filed on Mar. 18, 2015, which claims priority to and the benefit of Japanese Patent Application No. 2014-055202 filed on Mar. 18, 2014, the entire contents of which are incorporated herein by reference.

TECHNICAL FIELD

The present invention relates to a space device, a debris removal system including such a space device, a method for removing debris, and the like.

BACKGROUND ART

Currently is known that satellites launched in the past and completed its mission or broken, their fragments and wrecks such as an upper stage of a rocket as well as fragments resulting from their explosion or collision are existing as space debris in circling orbits above the earth. Such space debris may collide with space stations, satellites or rockets performing their missions correctly and may be the harmful risk for them, and therefore various techniques have been proposed for letting such space debris leave from the orbit for burning or collecting.

For instance, a technique is proposed, in which minute space debris is negatively charged through plasma environment in the space, and the altitude of the debris is decreased by the force of electrical field that acts to decelerate the debris so as to let the debris enter the atmosphere for burning and removal (see Patent Document 1). Recently another technique is proposed, in which a device for removing space debris is configured by covering a foam material with a jacket including a plurality of fabric layers (see Patent Document 2). According to this technique, space debris is made to collide with the jacket and is broken into a plurality of pieces. Then these pieces can be captured with the foam material and bound.

CITATION LIST

Patent Documents

Patent Document 1: JP2010-069973 A
Patent Document 2: JP2011-168270 A

SUMMARY

Technical Problem

According to the techniques described in Patent Document 1 and Patent Document 2, however, they are configured to burn or collect just minute space debris or relatively small space debris, and are not suitable for the removal of relatively large space debris. For the removal of relatively large space debris, no such techniques of approaching debris as a target and of capturing and stopping the rotation of debris have been established, and there are still many problems, such as poor cost-efficiency.

In view of these circumstances, the present invention aims to provide a debris removal system that can remove space debris of various sizes including relatively large one as well effectively, and a space device for the system.

Solution to Problem

To fulfill the aim, a space device according to the present invention includes: an adhesion part to adhere to a target existing in the space; and a propulsion part to obtain propulsion power, wherein the space device that adheres to the target at the adhesion part moves together with the target by the propulsion part, thereby conveying the target to a predetermined target position. A mother unit according to the present invention can carry the space device, and is configured to release the space device to the space.

With this configuration, the mother unit carrying a space device is launched into the space and is moved close to a target, and the space device is released from the mother unit in the space, is allowed to adhere to the target with the adhesion part, and is moved with the propulsion part so as to convey the target to a predetermined target position. Therefore when the target is space debris, for example, the space device can convey the space debris to the atmosphere for burning and removal. At this time, relatively large space debris also can be conveyed with the plurality of space devices. Collisions will happen often on a congested orbit, and a rocket and a satellite may be launched into the orbit in the future as well because it is a popular orbit. The mother unit placed there can remove the debris effectively. When the target is a normal satellite, the space device can convey such a satellite to a predetermined target position (e.g., a target position on another orbit). In this way, various types of mission can be performed in the space.

The space device according to the present invention may not have rotation-prevention means to prevent the rotation of a target.

When debris is removed using the space device according to the present invention, the space device does not have to prevent the rotation of the debris, and the space device and the space debris may rotate together as long as the device adheres to the debris. A force required to let the space debris enter the atmosphere is a force (braking force) to decelerate the space debris, and there is a good timing coming when such a braking force can be applied to the space debris even when the space debris rotate. When a satellite conveyance service is offered using the space device, since the satellite as a target does not rotate in an uncontrollable manner, there is no need to prevent the rotation. Therefore the space device does not have to have rotation-prevention means and so it can be small in size.

The space device according to the present invention may include an autonomous control part to control its own position and posture. The mother unit may include: a child unit control part to control the position and the posture of the space device.

With this configuration, the position and the posture of the space device can be controlled, so that the space device can easily adhere to a target.

A debris removal system according to the present invention is to remove space debris existing in the space using the space device as stated above, and includes: a guide-control part configured to move the space device close to the space debris so as to let the space device adhere to the space debris with the adhesion part; and a propulsion control part configured to control the propulsion part of the space device so as to move the space device adhering to the space debris toward the atmosphere together with the space debris by the propulsion part of the space device.

A method for removing debris according to the present invention is to remove space debris existing in the space using the space device as stated above, and includes: a guide step of moving the space device close to the space debris; an adhesion step of letting the space device adhere to the space debris with the adhesion part; and a conveyance step of moving the space device adhering to the space debris toward the atmosphere by the propulsion part of the space device so as to convey the space debris toward the atmosphere.

With these configuration and method, the space device is moved close to space debris, the space device is allowed to adhere to the space debris with the adhesion part, and the space device adhering to the space debris is moved with the propulsion part of the space device so as to convey the space debris to the atmosphere for burning and removal or move the space debris to an orbit (graveyard orbit) where collisions are less likely to occur. At this time, relatively large space debris also can be conveyed with the plurality of space devices.

The method for removing debris according to the present invention may include a debris-state acquisition step after the guide step and before the adhesion step, in which the shape, the gravity center or the weight of the space debris, the state of heat control and/or a rotation state and others of the space debris are acquired.

Such a method enables the acquisition of the shape and the rotation state of space debris during a time from the movement of the space device close to the space debris to the adhesion of the space device to the space debris as well as the acquisition of to what position of the space debris the space device finally approaches and in what direction the space device should adhere to the space debris.

The method for removing debris according to the present invention may further include a debris control step after the adhesion step, in which posture of the space debris is controlled.

Such a method allows the posture of space debris to be controlled after the space device adheres to the space debris.

A satellite conveyance system according to the present invention is to convey a satellite existing on a first orbit in the space using the space device as stated above, and includes: a guide-control part configured to move the space device close to the satellite so as to let the space device adhere to the satellite on the first orbit with the adhesion part; and a propulsion control part to control the propulsion part of the space device so as to move the space device adhering to the satellite toward a second orbit different from the first orbit together with the satellite by the propulsion part of the space device.

A method for conveying a satellite according to the present invention is to convey a satellite existing on a first orbit in the space using the space device as stated above, and includes: a guide step of moving the space device close to the satellite; an adhesion step of letting the space device adhere to the satellite with the adhesion part; and a conveyance step of moving the space device adhering to the satellite together with the satellite toward a second orbit different from the first orbit by the propulsion part of the space device so as to convey the satellite from the first orbit to the second orbit.

With these configuration and method, the space device is moved close to a satellite existing on a first orbit (e.g., an low-altitude orbit of 200 km to 1,000 km) in the space, the space device is allowed to adhere to the satellite with the adhesion part, and can be moved with the propulsion part of the space device so as to convey the satellite to a second orbit different from the first orbit. A satellite existing on a stationary orbit as the first orbit can be conveyed to a graveyard orbit (orbit with slightly higher-altitude than the stationary orbit) as the second orbit.

The satellite conveyance system according to the present invention may include a control part (autonomous control part or child unit control part) to control the posture and the position of the space device so as to let the space device adhere to the satellite on the first orbit with the adhesion part.

Since this configuration can control the posture and the position of the space device, the space device can adhere to a satellite on a first orbit reliably.

A satellite control system according to the present invention is to control position of a satellite existing on a stationary orbit in the space using the space device as stated above, and includes: a guide-control part configured to move the space device close to the satellite so as to let the space device adhere to the satellite on the stationary orbit with the adhesion part; and a propulsion control part to control the propulsion part of the space device so as to keep a position of the satellite on the stationary orbit while letting the space device adhere to the satellite.

A method for controlling a satellite according to the present invention is to control position of a satellite existing on a stationary orbit in the space using the space device as stated above, and includes: a guide step of moving the space device close to the satellite; an adhesion step of letting the space device adhere to the satellite with the adhesion part; and a position control step of controlling the propulsion part of the space device so as to keep a position of the satellite on the stationary orbit while letting the space device adhere to the satellite.

With these configuration and method, the space device is moved close to a satellite existing on a stationary orbit in the space, and is allowed to adhere to the satellite with the adhesion part, and the propulsion part of the space device is controlled so as to keep the position of the satellite on the stationary orbit (to implement orbit-keeping).

The debris removal system, the satellite conveyance system and the satellite control system according to the present invention may include a guide-control part installed on earth. The propulsion control part may be one installed on earth or one that the space device carries.

The space device (or the mother unit) according to the present invention may be configured to monitor the state of a satellite circling around a predetermined orbit. At this time, the space device (or the mother unit) may be configured to supply electric power to the satellite or may be configured to provide the satellite with a movement part.

With this configuration, the space device (or the mother unit) can monitor the state of a satellite circling around a predetermined orbit, can supply electric power to the satellite, and can provide a satellite with a movement part to move the satellite with the movement part. In this way, various services can be offered on the orbit.

A satellite monitoring system according to the present invention is to monitor a satellite circling around a predetermined orbit in the space using the space device or the mother unit as stated above and includes: a guide-control part configured to move the space device or the mother unit close to the satellite; and a monitor-control part configured to control the space device or the mother unit so as to make the space device or the mother unit monitor a state of the satellite.

A method for monitoring a satellite according to the present invention is to monitor a satellite circling around a predetermined orbit in the space using the space device as stated above, and includes: a guide step of moving the space device or the mother unit close to the satellite; and a monitoring step of making the space device or the mother unit monitor a state of the satellite.

With this configuration, the space device (or the mother unit) can monitor the state of a satellite circling around a predetermined orbit.

The satellite monitoring system according to the present invention may include a guide-control part installed on earth. The monitor-control part may be one installed on earth or one that the space device carries.

Advantageous Effects of Invention

The present invention can provide a debris removal system capable of effectively removing space debris of various sizes including relatively large one as well, and a space device for the system.

DESCRIPTION OF EMBODIMENTS

The following describes embodiments of the present invention, with reference to the drawings.

First Embodiment

Firstly, referring to FIGS. 1 and 2, the first embodiment of the present invention is described below. The first embodiment describes one example of a debris removal system according to the present invention and one example of a method for removing debris using this system.

Figure 1:
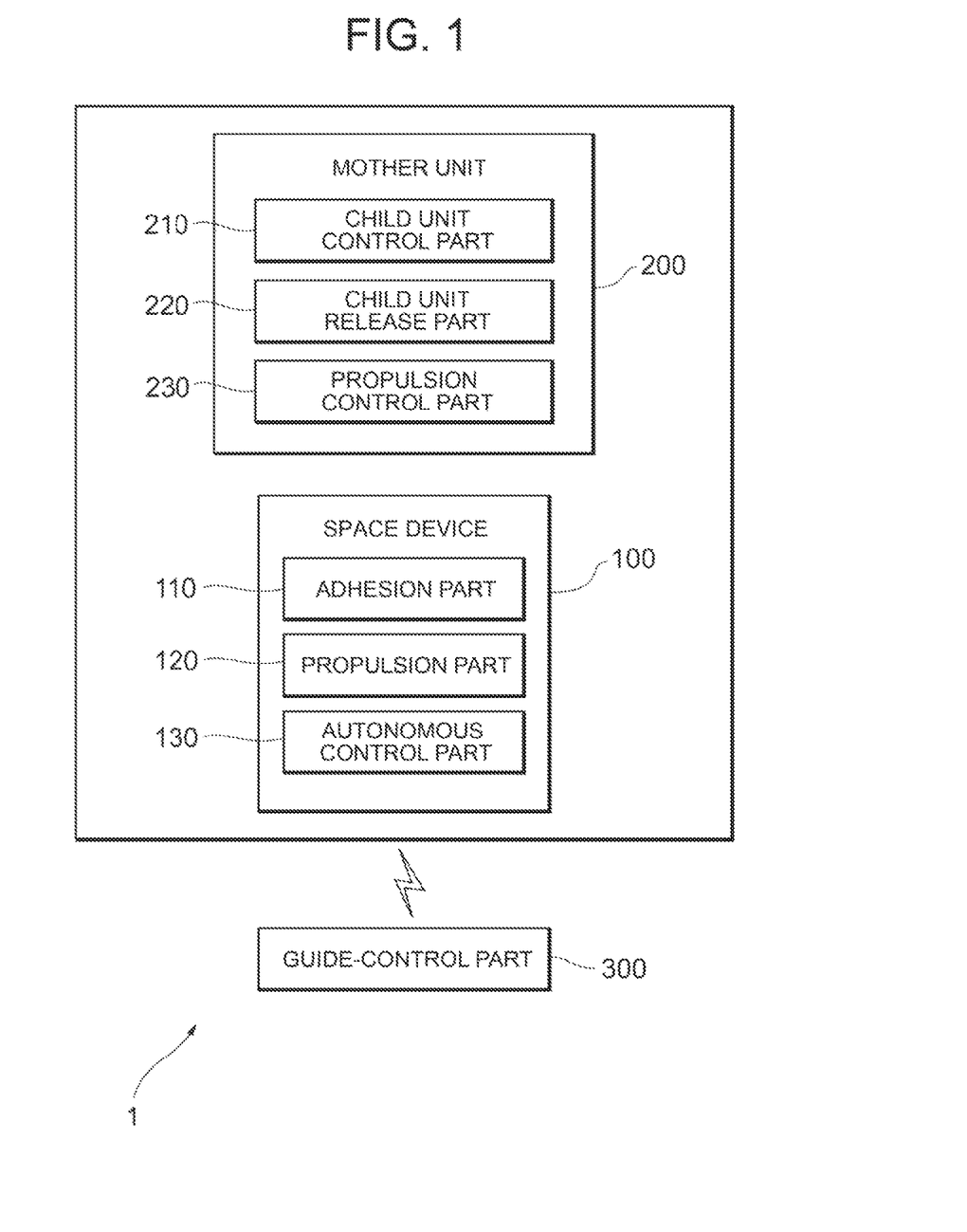
FIG. 1 shows the functional structure of a debris removal system according to one embodiment of the present invention.
Figure 2:
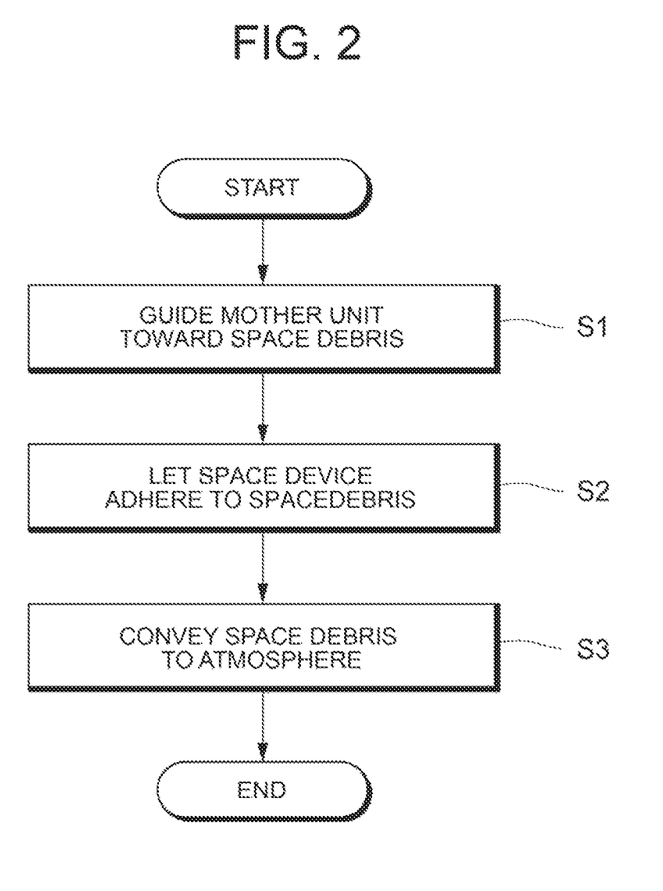
FIG. 2 is a flowchart to describe a method for removing debris using the debris removal system of FIG. 1.

Firstly, referring to FIG. 1, the configuration of a debris removal system 1 according to the present embodiment is described. The debris removal system 1 is to remove space debris existing in the space, and as shown in FIG. 1, it includes a space device (child unit) 100 that is launched into the space, a mother unit 200 capable of carrying the space device 100 and configured to release the space device 100 to the space, and a guide-control part 300 to guide the space device 100 to the place of space debris.

The space device 100 includes an adhesion part 110 that adheres to a target existing in the space and a propulsion part 120 to obtain propulsion power, and functions so as to adhere to a target with the adhesion part 110 and move with the propulsion part 120, thereby conveying the target to a predetermined target position. For the adhesion part 110, adhesive that can absorb the impact by the space debris and has adhesiveness, and can resist a temperature difference between the space environment and space debris and does not transmit heat to the body of the space device 100. In addition to such adhesive, a mechanical holding mechanism to hold space debris may be provided to assist the space device 100 in capturing of space debris. For the propulsion part 120, a solid-fueled thruster, a small-sized ion thruster, a digital thruster or the like can be used.

The space device 100 further has an autonomous control part 130 to control its own position and posture. For the autonomous control part 130, a thruster controller or the like may be used, which is configured to control a maneuvering thruster to correct the deviation in posture angle or in position detected by a gyro sensor or a GPS.

The mother unit 200 is attached to a cosmonautic vehicle such as a rocket while carrying the space device 100, and is configured to be launched into the space. The mother unit 200 in the present embodiment includes: a child unit control part 210 to control the position and the posture of the space device 100; a child unit release part 220 to release the space device 100 in the space, and a propulsion control part 230 to control the propulsion part 120 included in the space device 100 so as to convey a target to a predetermined target position.

For the child unit control part 210, a thruster controller or the like may be used, which is configured to control a maneuvering thruster to correct the deviation in posture angle or in position detected by a GPS or a star tracker. For the child unit release part 220, an actuator or the like may be used, which is configured to apply a force in the releasing direction to the space device 100. For the propulsion control part 230, a thruster controller or the like may be used, which is configured to control a thruster that is the propulsion part 120.

Note here that any one of the child unit control part 210 of the mother unit 200 and the autonomous control part 130 of the space device 100 may be used. In the present embodiment, the mother unit 200 carries a plurality of the space devices 100.

The guide-control part 300 is disposed at a base station installed on earth, which is to move the space devices 100 and the mother unit 200 by means of predetermined communication means so as to bring them close to space debris. Herein various controllers included in the mother unit 200 (the child unit control part 210 and the propulsion control part 230) may be disposed at the base station on earth so that the space device 100 is remote-controlled from the base station by predetermined communication means.

Referring next to the flowchart of FIG. 2, a method for removing debris using the debris removal system 1 according to the present embodiment is described below.

Firstly, the mother unit 200 carrying the space devices 100 is attached to a cosmonautic vehicle and is launched to move the mother unit 200 close to space debris as a target (guide step: S1). In the guide step S1, the mother unit 200 may be moved relatively close (e.g., the position of a few kilometers from the space debris) to space debris as a target by GPS navigation, for example, the mother unit 200 may be brought close to the space debris at a position of a few tens to hundreds of meters from the space debris using a star tracker or the like, and then the mother unit 200 may be brought close to the position of a few meters by an optic camera or the like.

Next, the space devices 100 are released from the mother unit 200, and the space devices 100 are allowed to adhere to the space debris with their adhesion parts 110 of the space devices 100 while controlling the posture and the position of the space devices 100 with their child unit control parts 210 (or the autonomous control parts 130) (adhesion step: S2). Next, the propulsion parts 120 of the space devices 100 are controlled by the propulsion control part 230 so as to convey the space debris toward the atmosphere (conveyance step: S3). This enables the space debris to enter the atmosphere for burning. The space devices 100 are burned with the space debris and disposed of.

In the debris removal system 1 according to the present embodiment as described above, the mother unit 200 carrying the space devices 100 is moved close to space debris, the space devices 100 are released from the mother unit 200, are allowed to adhere to the space debris with their adhesion parts 110, and are moved with the propulsion parts 120 of the space devices 100 so as to convey the space debris to the atmosphere for burning and removal. At this time, relatively large space debris also can be conveyed with the plurality of space devices 100.

In the method for removing debris according to the present embodiment as described above, an example where the adhesion step S2 follows the guide step S1 is shown, and a debris-state acquisition step may be performed between the guide step S1 and the adhesion step S2, in which the shape of the space debris and/or the rotation state of the space debris are acquired. Such a step enables the acquisition of the shape and the rotation state of space debris during a time from the movement of the mother unit 200 close to the space debris to the releasing of the space devices 100 so as to know a suitable release position or release direction, and then the mother unit 200 approaches the space debris finally to enable more reliable release and adhesion.

In the method for removing debris according to the present embodiment as described above, an example where the conveyance step S3 follows the adhesion step S2 is shown, and a debris control step may be performed between the adhesion step S2 and the conveyance step S3, in which the posture of the space debris is controlled. Such a step allows the control of the space debris in posture after adhesion of the space devices 100 to the space debris.

Second Embodiment

Figure 3:
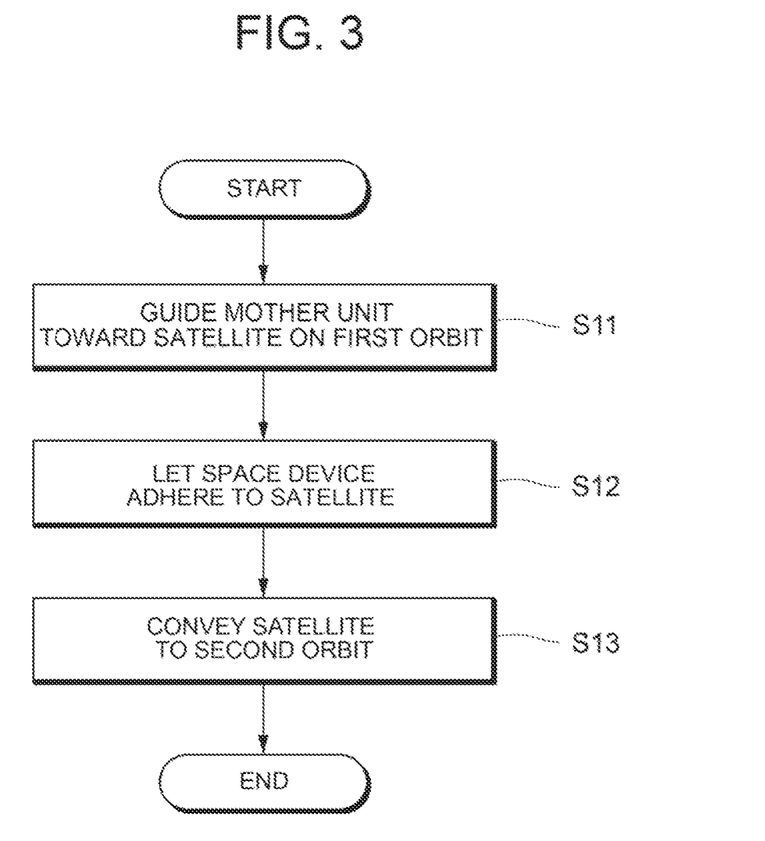
FIG. 3 is a flowchart to describe a method for conveying a satellite according to one embodiment of the present invention.

Next, referring to FIG. 3, the second embodiment of the present invention is described below. The second embodiment describes one example of a satellite conveyance system according to the present invention and one example of a method for conveying a satellite using this system.

The satellite conveyance system according to the present embodiment is to convey a satellite existing in the space. Since the configuration of the satellite conveyance system is substantially the same as that of the debris removal system 1 described in the first embodiment, their detailed descriptions are omitted, and the following description refers to the configuration of the first embodiment (the space device 100, the mother unit 200 and the like).

Referring to the flowchart of FIG. 3, a method for conveying a satellite using the satellite conveyance system according to the present embodiment is described below.

Firstly, the mother unit 200 carrying the space devices 100 is attached to a cosmonautic vehicle and is launched to move the mother unit 200 close to a satellite as a target (guide step: S11). In the guide step S11, the mother unit 200 may be moved relatively close (e.g., the position of 10 kilometers from the satellite) to the satellite existing on a first orbit by absolute GPS navigation, for example, the mother unit 200 may be brought closer at the position of a hundred meters from the satellite by GPS relatively navigation or using a star tracker, and then the mother unit 200 may be brought closer at a position of a few meters from the satellite by a proximity sensor, an optic camera or the like.

Next, the space devices 100 are released from the mother unit 200, and the space devices 100 are allowed to adhere to the satellite with their adhesion parts 110 of the space devices 100 while controlling the posture and the position of the space devices 100 with their child unit control parts 210 (or the autonomous control parts 130) (adhesion step: S12). Next, the propulsion parts 120 are controlled by the propulsion control part 230 so as to move the space devices 100 toward a second orbit different from the first orbit, thus conveying the satellite toward the second orbit (conveyance step: S13). This enables the satellite to move from the first orbit to the second orbit. The space devices 100 can coexist with the satellite in the state of adhering to the satellite.

In the satellite conveyance system according to the embodiment as described above, the mother unit 200 carrying the space devices 100 is moved close to the satellite existing on a first orbit (e.g., an low-altitude orbit of 200 km to 1,000 km) in the space, the space devices 100 are released from the mother unit 200 and are allowed to adhere to the satellite with their adhesion parts 110, and can be moved with the propulsion parts 120 of the space devices 100 so as to convey the satellite to a second orbit different from the first orbit.

Third Embodiment

Figure 4:
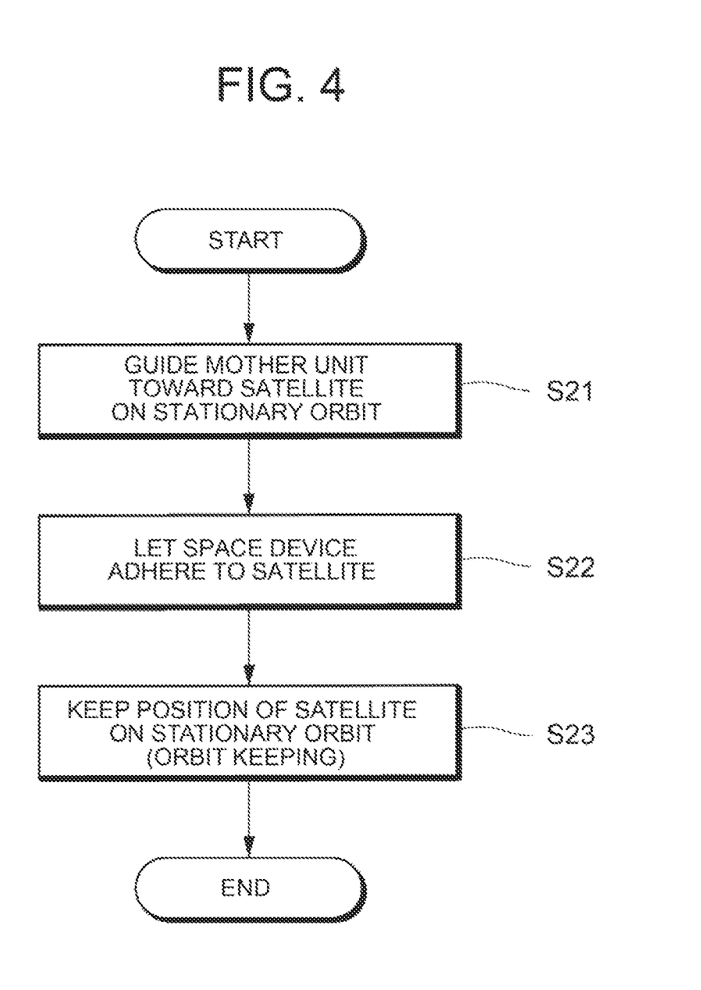
FIG. 4 is a flowchart to describe a method for controlling a satellite according to one embodiment of the present invention.

Next, referring to FIG. 4, the third embodiment of the present invention is described below. The third embodiment describes one example of a satellite control system according to the present invention and one example of a method for controlling a satellite using this system.

The satellite control system according to the present embodiment is to control the position of a satellite existing on a stationary orbit in the space to keep the orbit. Since the configuration of the satellite control system is substantially the same as that of the debris removal system 1 described in the first embodiment, their detailed descriptions are omitted, and the following description refers to the configuration of the first embodiment (the space device 100, the mother unit 200 and the like).

Referring to the flowchart of FIG. 4, a method for controlling a satellite using the satellite control system according to the present embodiment is described below.

Firstly, the mother unit 200 carrying the space devices 100 is attached to a cosmonautic vehicle and is launched to move the mother unit 200 close to a satellite as a target (guide step: S21). In the guide step S21, the mother unit 200 may be moved relatively close (e.g., the position of 10 kilometers from the satellite) to the satellite existing on a stationary orbit by absolute GPS navigation, for example, the mother unit 200 may be brought closer at the position of a hundred meters from the satellite by GPS relatively navigation or using a star tracker, and then the mother unit 200 may be brought closer at a position of a few meters from the satellite by a proximity sensor, an optic camera or the like.

Next, the space devices 100 are released from the mother unit 200, and the space devices 100 are allowed to adhere to the satellite with their adhesion parts 110 of the space devices 100 while controlling the posture and the position of the space devices 100 with their child unit control parts 210 (or the autonomous control parts 130) (adhesion step: S22). Next, the propulsion parts 120 of the space devices 100 are controlled by the propulsion control part 230 so as to keep the position of the satellite on the stationary orbit to which the space devices 100 adhere (position control step: S23). This enables the satellite to keep the position on the stationary orbit (orbit-keeping). In this case as well, the space devices 100 can coexist with the satellite in the state of adhering to the satellite.

In the satellite control system according to the embodiment as described above, the mother unit 200 carrying the space devices 100 is moved close to the satellite existing on a stationary orbit in the space, the space devices 100 are released from the mother unit 200 and are allowed to adhere to the satellite with their adhesion parts 110, and then the position of the satellite on the stationary orbit can be kept (implement orbit-keeping) by controlling the propulsion parts 120 of the space devices 100.

Fourth Embodiment

Figure 5:
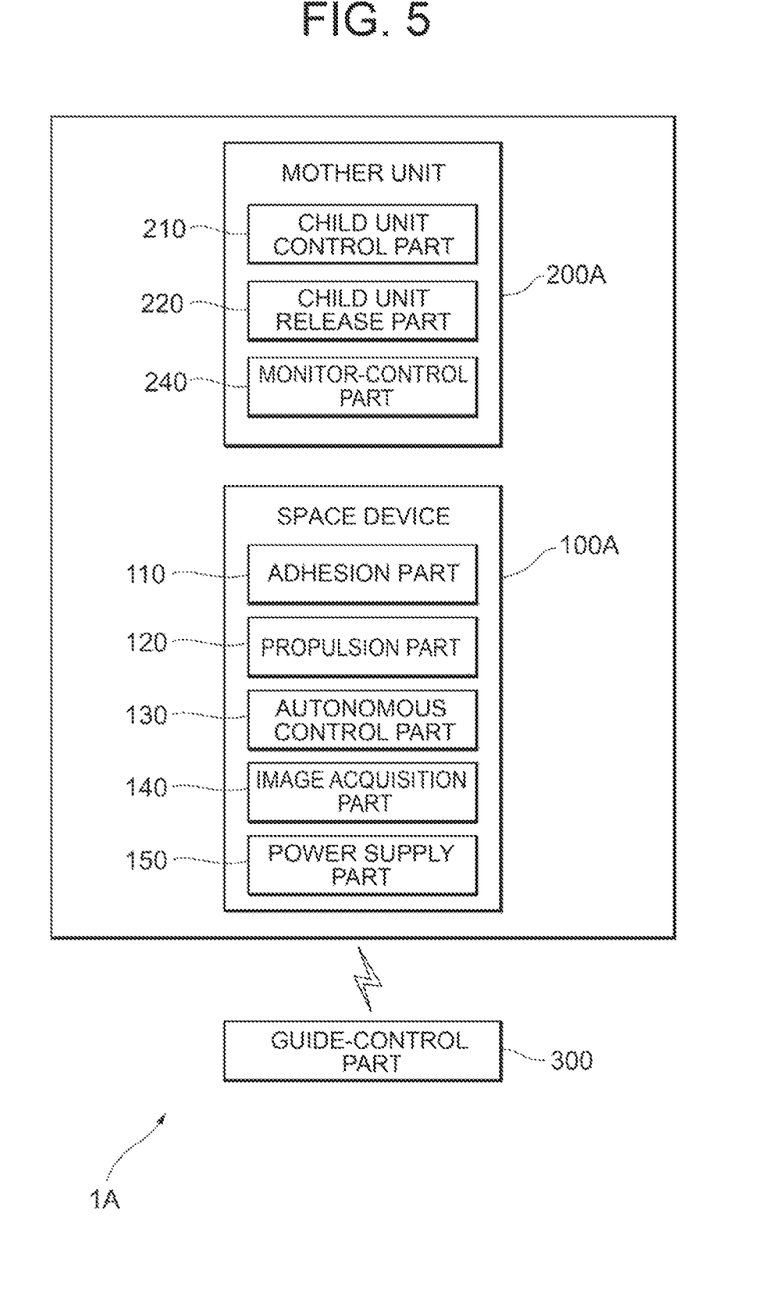
FIG. 5 shows the functional structure of a satellite monitoring system according to one embodiment of the present invention.

Next, referring to FIGS. 5 and 6, the fourth embodiment of the present invention is described below. The fourth embodiment describes one example of a satellite monitoring system according to the present invention and one example of a method for monitoring a satellite using this system.

Firstly referring to FIG. 5, the configuration of the satellite monitoring system 1A according to the present embodiment is described below. The satellite monitoring system 1A is to monitor a satellite circling around a predetermined orbit in the space, and as shown in FIG. 5, it includes a space device (child unit) 100A that is launched into the space, a mother unit 200A capable of carrying the space device 100A and configured to release the space device 100A to the space, and a guide-control part 300 to guide the space device 100A and the mother unit 200A to the place of a satellite. Since the guide-control part 300 is common to that described in the first embodiment, their detailed descriptions are omitted.

The space device 100A includes an adhesion part 110 that adheres to a target existing in the space, a propulsion part 120 to obtain propulsion power, an autonomous control part 130 to control its own position and posture, an image acquisition part 140 to acquire image information on the target, and a power supply part 150 to supply electric power to the target. In the present embodiment, the mother unit 200A carries one space device 100A, and the mother unit 200A may carry a plurality of the space devices 100A.

Since the adhesion part 110, the propulsion part 120 and the autonomous control part 130 are common to those described in the first embodiment, their detailed descriptions are omitted. For the image acquisition part 140, a CMOS (complementary metal-oxide semiconductor) image sensor, a CCD (charge-coupled device) image sensor, an EMCCD (electron multiplying charge-coupled device) image sensor or the like may be used. For the power supply part 150, a cable or the like may be used to supply electric power from a power supply (solar cell, fuel cell, chemical cell or the like) to a target.

The mother unit 200A is attached to a cosmonautic vehicle such as a rocket while carrying the space device 100A, and is configured to be launched into the space. The mother unit 200A in the present embodiment includes: a child unit control part 210 to control the position and the posture of the space device 100A; a child unit release part 220 to release the space device 100A in the space, and a monitor-control part 240 to control the image acquisition part 140 included in the space device 100A so as to monitor the state of a satellite.

Since the child unit control part 210 and the child unit release part 220 are common to those described in the first embodiment, their detailed descriptions are omitted. For the monitor-control part 240, a computer may be used, which includes a manipulation part to manipulate the image acquisition part 140 remotely, an image processing part to process an image acquired through the image acquisition part 140, an abnormality determination part to determine the presence or not of abnormality from the processed image, and the like.

The monitor-control part may be disposed at a base station installed on earth. Alternatively, the monitor-control part may be disposed at the space device 100A, and the image acquisition part and the power supply part may be disposed at the mother unit 200A. The mother unit 200A or the space device 100A may include means to provide an alternative movement part to a satellite if a movement part (e.g., thruster) of the satellite as a target is broken.

Figure 6:
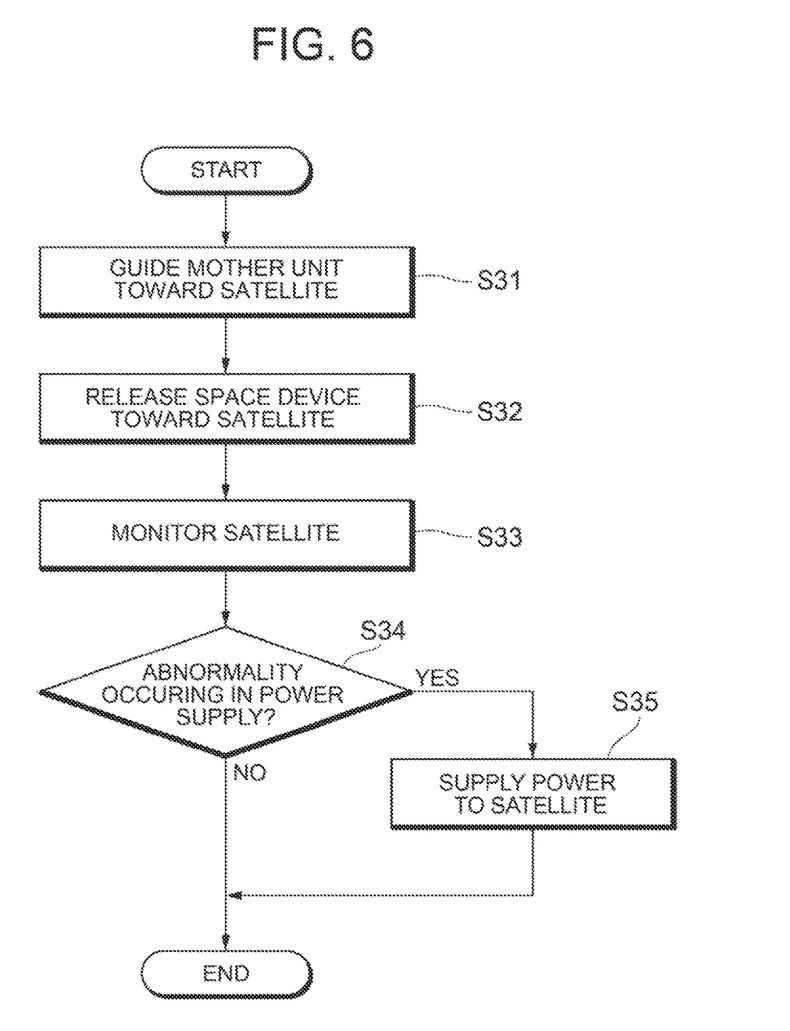
FIG. 6 is a flowchart to describe a method for monitoring a satellite using the satellite monitoring system of FIG. 5.

Next, referring to the flowchart of FIG. 6, the following describes a method for monitoring a satellite using the satellite monitoring system 1A according to the present embodiment.

Firstly, the mother unit 200A carrying the space device 100A is attached to a cosmonautic vehicle and is launched to move the mother unit 200A close to a satellite as a target (guide step: S31). In the guide step S31, the mother unit 200A may be moved relatively close (e.g., the position of a few kilometers from the satellite) to the satellite circling around a predetermined orbit by GPS navigation, for example, the mother unit 200A may be brought closer at a position of a hundred tens to hundreds of meters from the satellite using a star tracker or the like, and then the mother unit 200A may be brought closer at a position of a few meters from the satellite by an optic camera or the like.

Next, the space device 100A is released from the mother unit 200A toward the satellite, and the space device 100A is allowed to drift near the satellite or to adhere to the satellite with their adhesion part 110 of the space device 100A while controlling the posture and the position of the space device 100A with the child unit control part 210 (or the autonomous control part 130) (child unit release step: S32). Next, the state of the satellite is monitored with the image acquisition part 140 of the space device 100A and the monitor-control part 240 of the mother unit 200A (monitoring step: S33). Following this, abnormality of the satellite is determined with the monitor-control part 240 of the mother unit 200A (abnormality determination step: S34), and if it is determined that the power supply of the satellite is broken, electric power is supplied to the satellite from the power supply part 150 of the space device 100A (power supplying step: S35). Thereby, electric power is supplied to the satellite having the broken power supply, whereby the satellite can be reused.

In the above-described satellite monitoring system according to the present embodiment, the space device 100A and the mother unit 200A can monitor the state of a satellite circling around a predetermined orbit.

In the embodiments described above, when all of the space devices are released from the mother unit, a cosmonautic vehicle carrying a new space device may be launched toward the mother unit, so that the mother unit may be charged with the new space device from the cosmonautic vehicle. This enables a long time use of the mother unit without disposing of it, meaning fewer burdens on environment, and the cost required for performing a predetermined mission can be reduced.

The embodiments described above show an example where the posture and the position of the space device released from the mother unit are controlled with the child unit control part and the autonomous control part, the space device released from the mother unit may be allowed to adhere to a target (space debris or satellite) without controlling the posture and the position of the space device.

Although the first to the third embodiments and the fourth embodiment show the examples where different space devices and the mother unit are used, the debris removal system, the satellite conveyance system, the satellite control system and the satellite monitoring system may be configured using common space device and mother unit. This allows the four services (debris removal, satellite conveyance, satellite orbit keeping, satellite monitoring) to be implemented using the common space device and mother unit, so that profit obtained from the satellite conveyance business and the satellite monitoring business can be used for debris removal. Therefore the space device and the mother unit according to the present invention may solve the delay of debris removal resulting from financial difficulty (absence of sponsors).

Although the embodiments described above show an example where the four services (debris removal, satellite conveyance, satellite orbit keeping, satellite monitoring) are offered separately using different systems, the four services can be offered continuously using a common system that can function as the debris removal system, the satellite conveyance system, the satellite control system and the satellite monitoring system. For instance, after a satellite is conveyed from a predetermined low-altitude orbit to a stationary orbit using the common system functioning as the satellite conveyance system, the orbit of the satellite on the stationary orbit is kept using the common system functioning as the satellite control system while monitoring the satellite on the stationary orbit using the common system functioning as the satellite monitoring system, and if the satellite reaches the end of life, the broken satellite can be conveyed to the atmosphere using the common system functioning as the debris removal system for burning and removal.

Although the embodiments described above show an example where the four services (debris removal, satellite conveyance, satellite orbit keeping, satellite monitoring) are offered using different systems, fixing means (e.g., robot arm) to fix a broken part of the satellite may be disposed at the space device 100A and the mother unit 200A of the satellite monitoring system 1A, whereby a satellite fixing service may be offered.

Although the embodiments described above show examples where the target (space debris or satellite) to which the space device adheres at the adhesion part is conveyed or the orbit of the target in such a state is kept, another configuration to detach the space device from the target after a predetermined mission (conveyance or orbit-keeping) is completed may be used. For instance, a rod-shaped projecting part projecting from the center of the adhesive as the space device toward the target may be disposed. When the space device adheres to the target at the adhesion part and finishes a predetermined mission, this projecting part is allowed to project toward the target so as to cancel the adhesion state so as to detach the space device from the target. Thereafter the space device may reenter the atmosphere for destruct or move to a graveyard orbit. Since a living satellite is typically designed to control itself only, any unnecessary space device is preferably detached from the satellite. In this regard, the adhesion part and a simple mechanism (projecting part) as stated above can facilitate the detachment of the space device from the target.

The present invention is not limited to the embodiments as stated above, and design modifications to these embodiments, which will be made by a person skilled in the art as appropriate, are also included in the scope of the present invention as long as they have the features of the present invention. That is, each element in the above embodiments and the arrangement, materials, conditions, shapes, dimensions, etc., thereof are not limited to those described above and may be modified as appropriate. Each element in these embodiments can be combined as long as such combination is technically possible, and such a combination also is included in the scope of the present invention as long as they have the features of the present invention.

REFERENCE SIGNS LIST

1 Debris removal system (satellite conveyance system, satellite control system)
1A Satellite monitoring system
100, 100A Space device
110 Adhesion part
120 Propulsion part
130 Autonomous control part
200, 200A Mother unit
210 Child unit control part
220 Child unit release part
230 Propulsion control part
240 Monitor-control part
300 Guide-control part
S1, S11, S21, S31 Guide step
S2, S12, S22 Adhesion step
S3, S13 Conveyance step
S23 Position control step
S33 Monitoring step

What is claimed is:

1. A space device, comprising:
an adhesion part to adhere to a target existing in space and to absorb an impact by the target; and
a thruster,
wherein the space device couples with the target using only an adhesive of the adhesion part and moves together with the target by pushing the target with the thruster, thereby conveying the target to a predetermined target position, and
wherein the space device is configured to push the adhesion part to the target using propulsion power generated by the thruster.

2. The space device according to claim 1, wherein the space device is configured to monitor a state of a satellite circling around a predetermined orbit.

3. The space device according to claim 2, wherein the space device is configured to supply electric power to the satellite.

4. The space device according to claim 2, wherein the space device is configured to provide the satellite with a movement part.

5. A satellite monitoring system to monitor a satellite circling around a predetermined orbit in space using the space device of claim 2, the satellite monitoring system comprising:
a controller configured to move the space device close to the satellite; and
a computer configured to control the space device so as to make the space device monitor a state of the satellite.

6. The satellite monitoring system according to claim 5, wherein the controller and the computer are disposed at a base station on earth.

7. A debris removal system to remove space debris existing in the space using the space device according to claim 1, comprising:

a controller configured to move the space device close to the space debris so as to let the space device adhere to the space debris with the adhesion part; and a thruster controller configured to control the thruster of the space device so as to move the space device adhering to the space debris toward the atmosphere together with the space debris by the thruster of the space device.

8. The debris removal system according to claim 7, wherein the controller and the thruster controller are disposed at a base station on earth.

9. A satellite conveyance system to convey a satellite existing on a first orbit in space using the space device according to claim 1, comprising:

a guide-control part configured to move the space device close to the satellite so as to let the space device adhere to the satellite on the first orbit with the adhesion part; and a thruster controller to control the thruster of the space device so as to move the space device adhering to the satellite toward a second orbit different from the first orbit together with the satellite by the thruster of the space device.

10. The satellite conveyance system according to claim 9, wherein the guide-control part and the thruster controller are disposed at a base station on earth.

11. A satellite control system to control position of a satellite existing on a stationary orbit in space using the space device according to claim 1, comprising:

a guide-control part configured to move the space device close to the satellite so as to let the space device adhere to the satellite on the stationary orbit with the adhesion part; and a thruster controller to control the thruster of the space device so as to keep a position of the satellite on the stationary orbit while letting the space device adhere to the satellite.

12. The satellite control system according to claim 11, wherein the guide-control part and the thruster controller are disposed at a base station on earth.

13. A method for removing debris to remove space debris existing in space using the space device according to claim 1, comprising:

a guide step of moving the space device close to the space debris;

an adhesion step of letting the space device adhere to the space debris with the adhesion part; and a conveyance step of moving the space device adhering to the space debris toward the atmosphere by the thruster of the space device so as to convey the space debris toward the atmosphere.

14. The method for removing debris according to claim 13, further comprising: a debris-state acquisition step performed after the guide step and before the adhesion step, in which a shape of the space debris and/or a rotation state of the space debris are acquired.

15. The method for removing debris according to claim 13, further comprising: a debris control step performed after the adhesion step, in which posture of the space debris is controlled.

16. A method for conveying a satellite existing on a first orbit in space using the space device according to claim 1, comprising:

a guide step of moving the space device close to the satellite;

an adhesion step of letting the space device adhere to the satellite with the adhesion part; and a conveyance step of moving the space device adhering to the satellite together with the satellite toward a second orbit different from the first orbit by the thruster of the space device so as to convey the satellite from the first orbit to the second orbit.

17. A method for controlling position of a satellite existing on a stationary orbit in space using the space device according to claim 1, comprising:

a guide step of moving the space device close to the satellite;

an adhesion step of letting the space device adhere to the satellite with the adhesion part; and a position control step of controlling the thruster of the space device so as to keep a position of the satellite on the stationary orbit while letting the space device adhere to the satellite.

18. A method for monitoring a satellite circling around a predetermined orbit in space using the space device of claim 1, comprising:

a guide step of moving the space device close to the satellite; and a monitoring step of making the space device monitor a state of the satellite.

* * * * *